Jan. 21, 1936.  W. MARCROFT  2,028,679
WINDING MACHINE
Filed Aug. 16, 1933  7 Sheets-Sheet 5
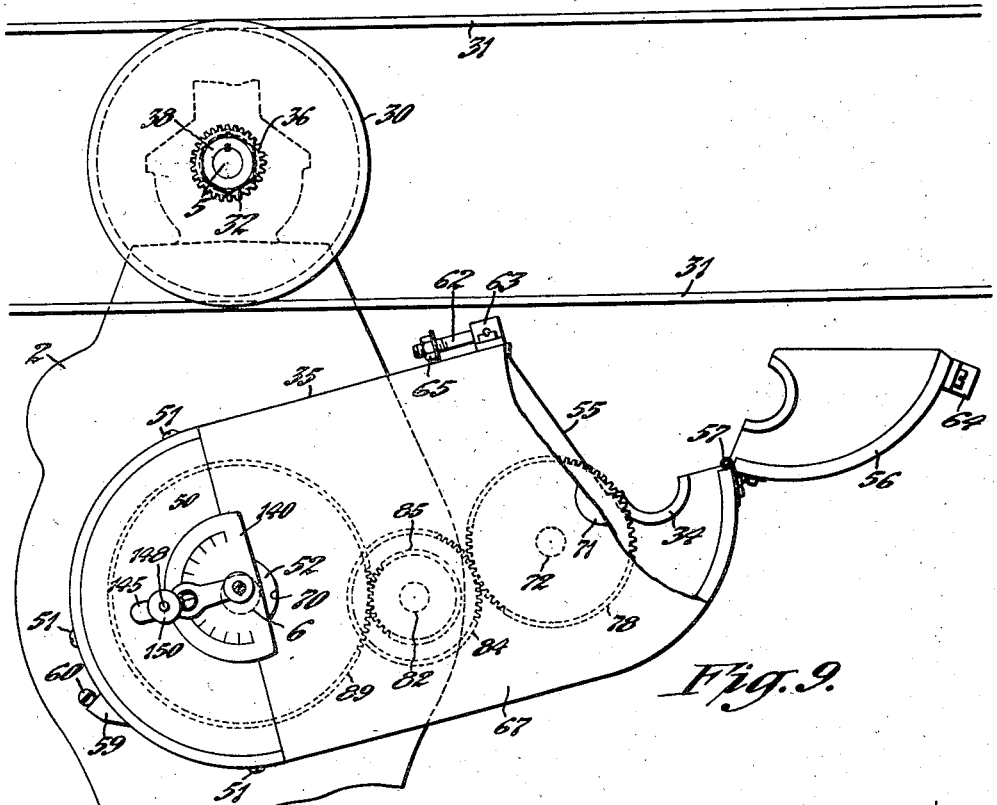
Fig. 9.
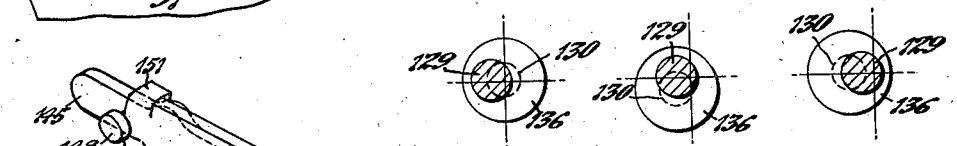
Fig. 13.  Fig. 14.  Fig. 15.
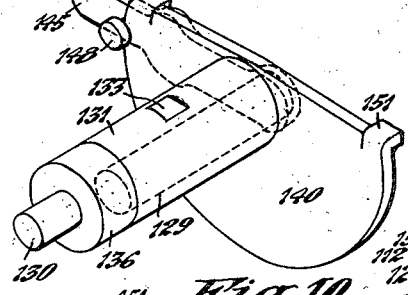
Fig. 10.
Fig. 16.
Fig. 12.
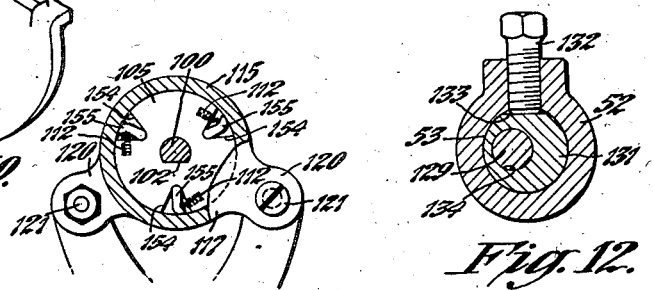
Fig. 11.
Inventor:
William Marcroft,
By
Watson, Coit, Morse & Grindle
Attorneys Jan. 21, 1936.  W. MARCROFT  2,028,679
WINDING MACHINE
Filed Aug. 16, 1933  7 Sheets-Sheet 6

Inventor:
William Marcroft,
By
Watson, Coit, Morse & Grindle
Attorneys.

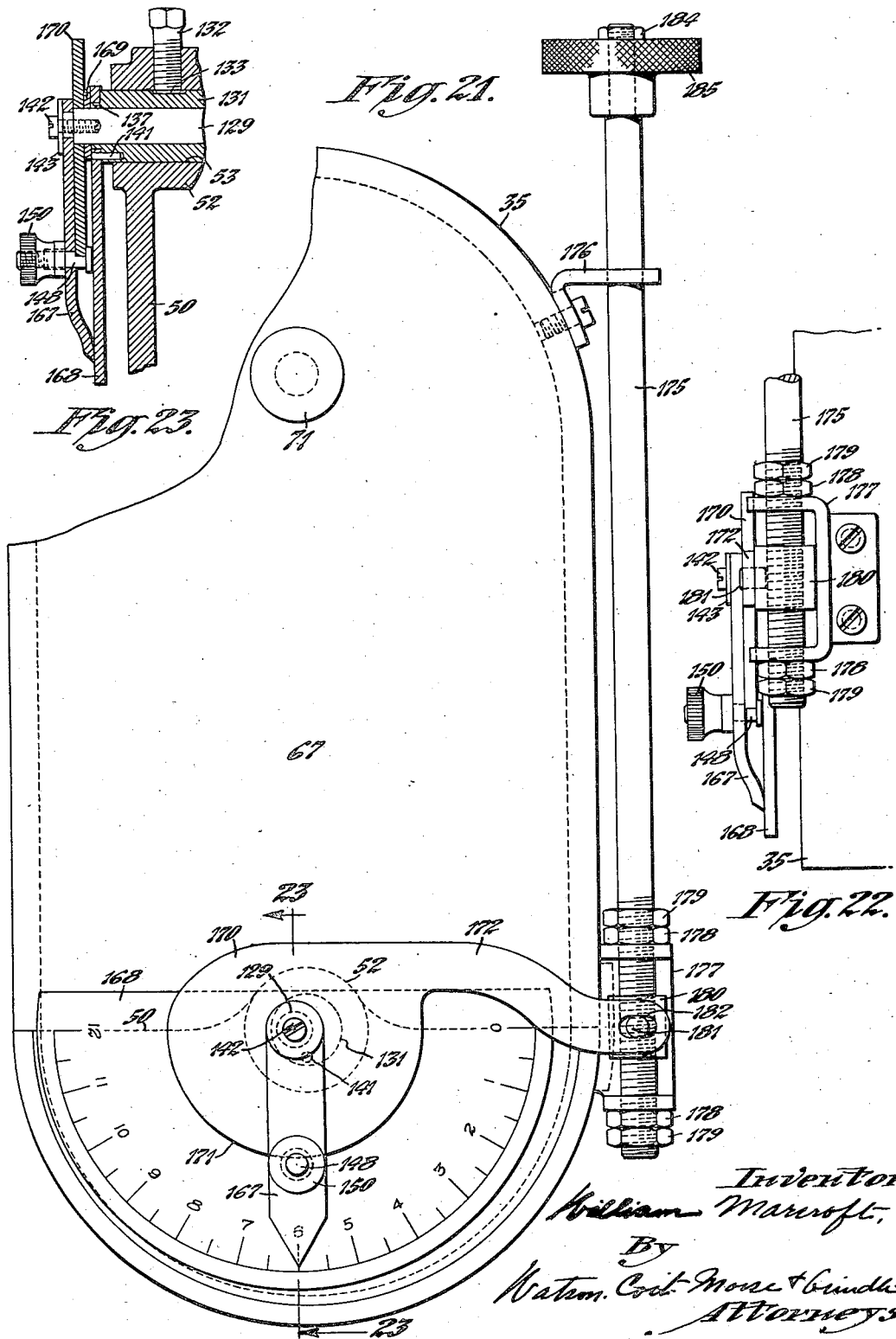

Patented Jan. 21, 1936

2,028,679

UNITED STATES PATENT OFFICE 2,028,679

WINDING MACHINE

William Marcroft, South Chatham, Mass.

Application August 16, 1933, Serial No. 685,461

10 Claims. (Cl. 74—115)

This invention relates to winding machines for winding cops, cones, and other types of packages of thread, yarn, cord and like strand materials. More particularly, the present invention relates to a "gainer" mechanism, so-called, for controlling the ratio of speed between the traversing means and the winding-spindle of the machine to regulate the disposition of the turns or coils of yarn to produce a cross wound package with the coils disposed in close relationship.

In the following specification and claims the term "thread" is employed in a generic sense to indicate the material to be wound, whatever its character; and the term "package" is to be interpreted broadly as designating the product of the winding machine whatever form it may take.

One object of the present invention is to provide an improved mechanism of the type indicated which is positive in action and adapted for accurate and minute adjustment in accordance with the size or count of the thread to be wound.

Another object of the invention is to provide a gainer mechanism of the type indicated having a train of gearing between the winding-spindle and the traversing mechanism with means incorporated therein for minutely regulating the gear ratio to secure a very accurate "gain" in the speed of the traversing thread-guide over that of the spindle, or vice versa.

Another object of the invention is to provide a mechanism of the type indicated which is constituted as a unit adapted for application to winding machines already in use without material change in their structure.

Further objects of the invention are set forth in the following specification which describes a preferred form of construction of the device, by way of example, as illustrated by the accompanying drawings. In the drawings:

Fig. 9 is an end view of the winding machine in reduced scale showing the driving means for the spindle and illustrating the method of displacing the gainer mechanism to permit placing the belt on the driving pulley;

Fig. 10 is an enlarged perspective view of the adjusting device for the gainer mechanism illustrating the relative position of the parts when set for zero "gain";

Fig. 11 is a similar perspective view showing the relationship of the parts when the device is adjusted to obtain substantially one-half the maximum amount of "gain";

Fig. 12 is a cross-sectional view through the eccentric bearing for the adjusting device, taken on line 12—12 of Fig. 3;

Figs. 13, 14 and 15 are more or less diagrammatic views of the adjusting device showing the eccentric means in different positions of adjustment;

Fig. 16 is an end view of the clutch-device showing a modified form of construction of the frictional gripper-means therefor;

Fig. 21 is an end elevation of the gainer adjusting mechanism showing a micrometer setting device applied thereto;

Fig. 22 is a partial side view of the same; and

Fig. 23 is a sectional view of the micrometer adjusting means taken on line 23—23 of Fig. 21.

The present improved gainer mechanism comprises, in general, a driving gear driven from the winding-spindle or drive-shaft of the winding machine; a driven element fast on the shaft which actuates the traversing mechanism; and a planet gear or pinion carried by the driven member in mesh with the driving gear and arranged to revolve about the driven shaft. For convenience of description the drive-shaft is hereinafter referred to as the spindle and the driven-shaft called the cam-shaft; these shafts being two of the essential elements of the winding machine as herein illustrated. The driving gear arranged free to rotate on the cam-shaft is driven from the spindle through a train of gearing to thereby impart orbital travel to the planet-gear which is carried on the driven element. Through this arrangement of the gearing the cam-shaft is rotated from the winding-spindle with a substantially fixed ratio of speed therebetween to impart reciprocatory movement to the thread-guide in the usual manner.

In accordance with the present invention the gainer mechanism may be adjusted to effect a gain in the ratio of speed between the thread-guide and spindle to cause each turn of the thread to be advanced with respect to the previously wound turn so that the coils or turns are laid side by side. The means for effecting the gain comprises a friction clutch-device which operates to continuously rotate the planet-pinion to cause it to advance relatively of the driving gear to impart an increment of motion to the cam-shaft. In this manner the speed of the cam-shaft is increased slightly beyond the predetermined fixed rate as initially determined by the ratio of the gears in the train.

Figure 1:
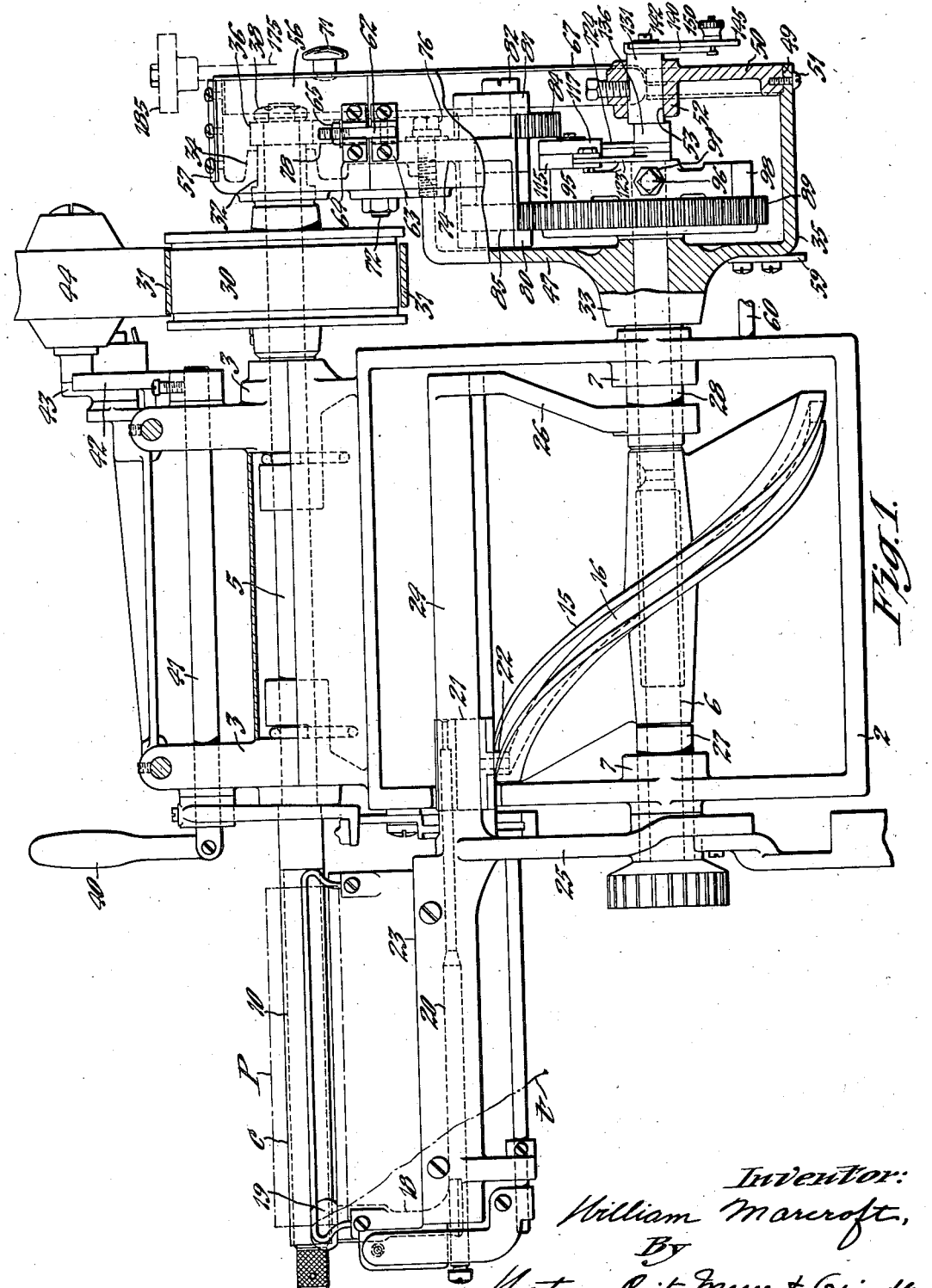
Fig. 1 is a side elevation of a winding machine of conventional type showing the present improved gainer mechanism as applied to use therewith.

The present drawings illustrate a conventional type of winding machine in which the cop, cone or package of strand material is wound on a positively driven winding-spindle and the thread traversed longitudinally thereof by means of a reciprocating thread-guide. Referring first to Fig. 1 of the drawings, the box-like frame 2 of the machine is provided with upper, spaced bearings 3, in which the winding-spindle 5 is journaled; and arranged therebelow in parallel relation thereto is a cam-shaft 6 journaled in bearings 7. The winding-spindle 5 overhangs the forward side of the frame 2 and carries a suitable form of cop-holder 10 for receiving the paper cop-tube c on which the package is wound.

Fast on the cam-shaft 6 is a cam 15 formed with a generally cylindrical rim in which is a helical groove 16. The cam 15 is connected to reciprocate a thread-guide 18 of usual construction embodying a head 19 formed with a groove or slot through which the thread t feeds to direct it onto the package being wound. The thread-guide 18 is carried at the end of a horizontal rod or traverse-bar 20 which is connected to a slide or crosshead 21 having a bowl or roller 22 engaging in the helical groove 16 of the cam 15.

The thread-guide 18 and its traverse-bar 20, together with the connected crosshead 21, are arranged to slide in a traverse-frame 23 supported from the cam-shaft 6. The traverse-frame 23 comprises a horizontal portion 24 formed with suitable grooves or guideways for the crosshead 21 and traverse-bar 20 and supported by opposite legs 25 and 26 straddling the cam 15 and pivotally mounted on the cam-shaft 6. The legs 25 and 26 of the traverse-frame 23 terminate in hubs surrounding bushings 27 and 28 which are held in the bearings 7 of the frame 2 to serve as journals for the cam-shaft 6. The rearward bushing 28 is formed as part of a casing or housing 35 which encloses the gainer mechanism to be later described.

The machine may be driven from a motor or other suitable source of power and, as herein shown, a driving pulley 30 of the flanged type is secured fast on the rearward end of the winding-spindle 5 to adapt it to be driven from a transmission belt 31 in contact with its upper periphery. The hub 32 of the pulley 30 extends through a split bearing 34 in the side of the gear-casing 35 and abutting its end is a pinion 36 which is keyed rotatively to the end of the winding-spindle 5 at 37. A nut 38 screwed onto the reduced threaded end of the spindle 5 abutting a shoulder formed thereby secures the pinion 36 axially in place.

The cam-shaft 6 is driven from the spindle 5 at a predetermined rate of speed through means to be later described and the cam 15 is rotated to reciprocate the thread-guide 18 back and forth axially of the cop-tube c to deposit the thread in helical coils or turns which build up in overlying concentric layers to form the package P, indicated by dot-and-dash lines in Fig. 1. Means are provided for starting the operation of the machine by manipulating a lever or handle 40 located at the forward end of the machine. The manually controlled starting mechanism is similar to that shown and described in an application for United States Letters Patent, Serial No. 442,418 filed April 7, 1930, and is, therefore, not herein described in detail. As illustrated in Fig. 1 of the drawings, the handle 40 is carried at the end of a rocker-shaft or rod 41 journaled in upward extensions of the bearings 3 for the winding-spindle 5. Fast on the rearward end of the rod 41 is an arm 42 for actuating a pivoted lever 43 carrying an idler-pulley 44. As the handle 40 is rocked the arm 42 is swung away from the lever 43 to permit the pulley 44 to be lowered against the length of driving belt 31 extending horizontally above the driving pulley 30. As the idler-pulley 44 is carried against the belt 31 by the force of gravity, or otherwise, the belt is pressed into contact with the periphery of the pulley 30 to rotate the latter to drive the spindle 5.

Figure 2:
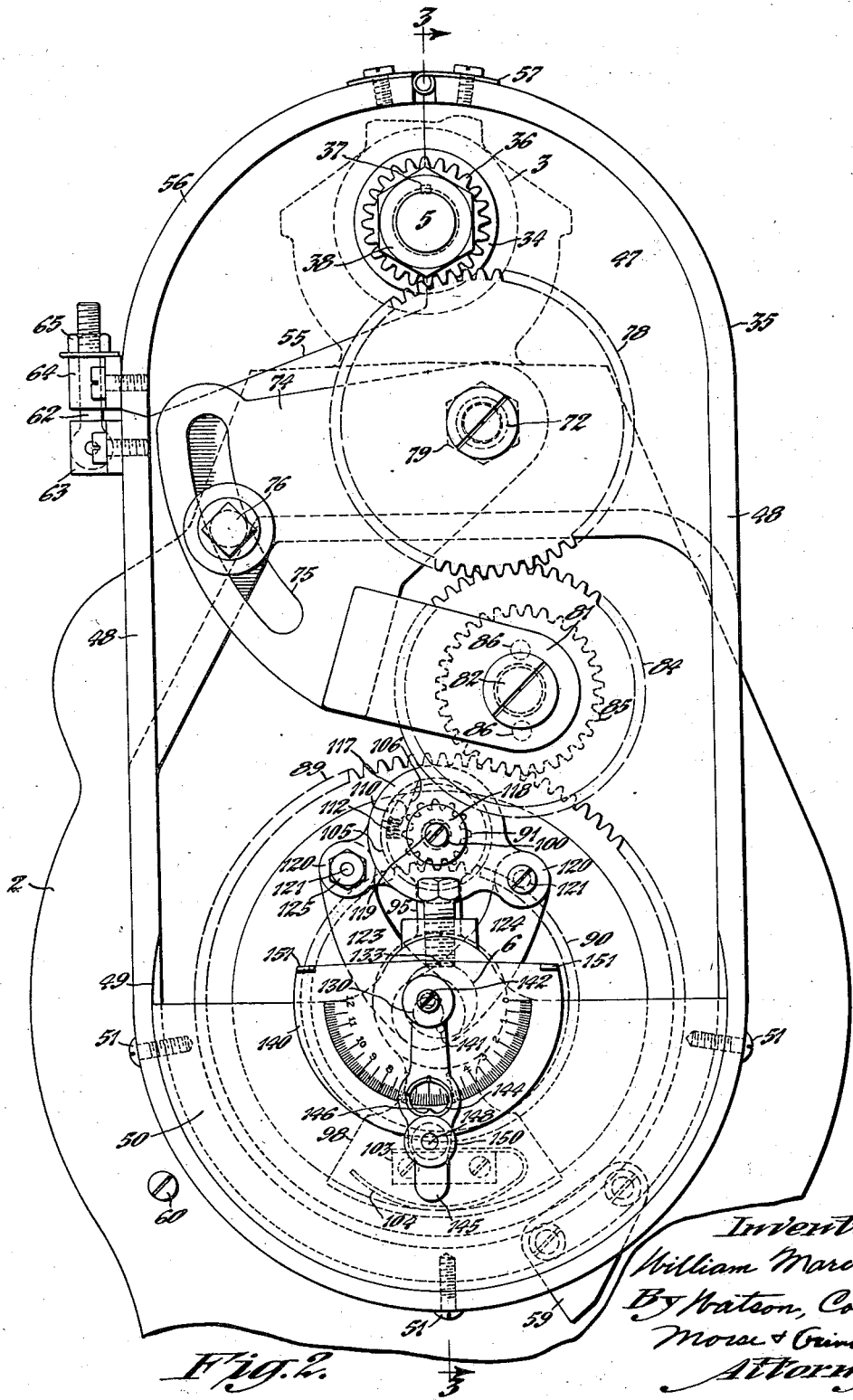
Fig. 2 is an end elevation of the gainer mechanism shown with the cover of its casing removed.

The gainer mechanism of the present invention is mounted within the gear-casing or housing 35, previously mentioned, which is constructed with a rear wall 47 bounded by side walls 48 projecting forwardly therefrom. The housing 35 is of semicircular outline at top and bottom as shown in Fig. 2, the curved bottom walls being provided with a recessed ledge 49 for receiving the rim of a substantially semicircular plate 50 fastened in place by means of screws 51. The plate 50 is provided with an integral boss 52 having a central bore 53 which is axially alined with the cam-shaft 6.

Figure 3:
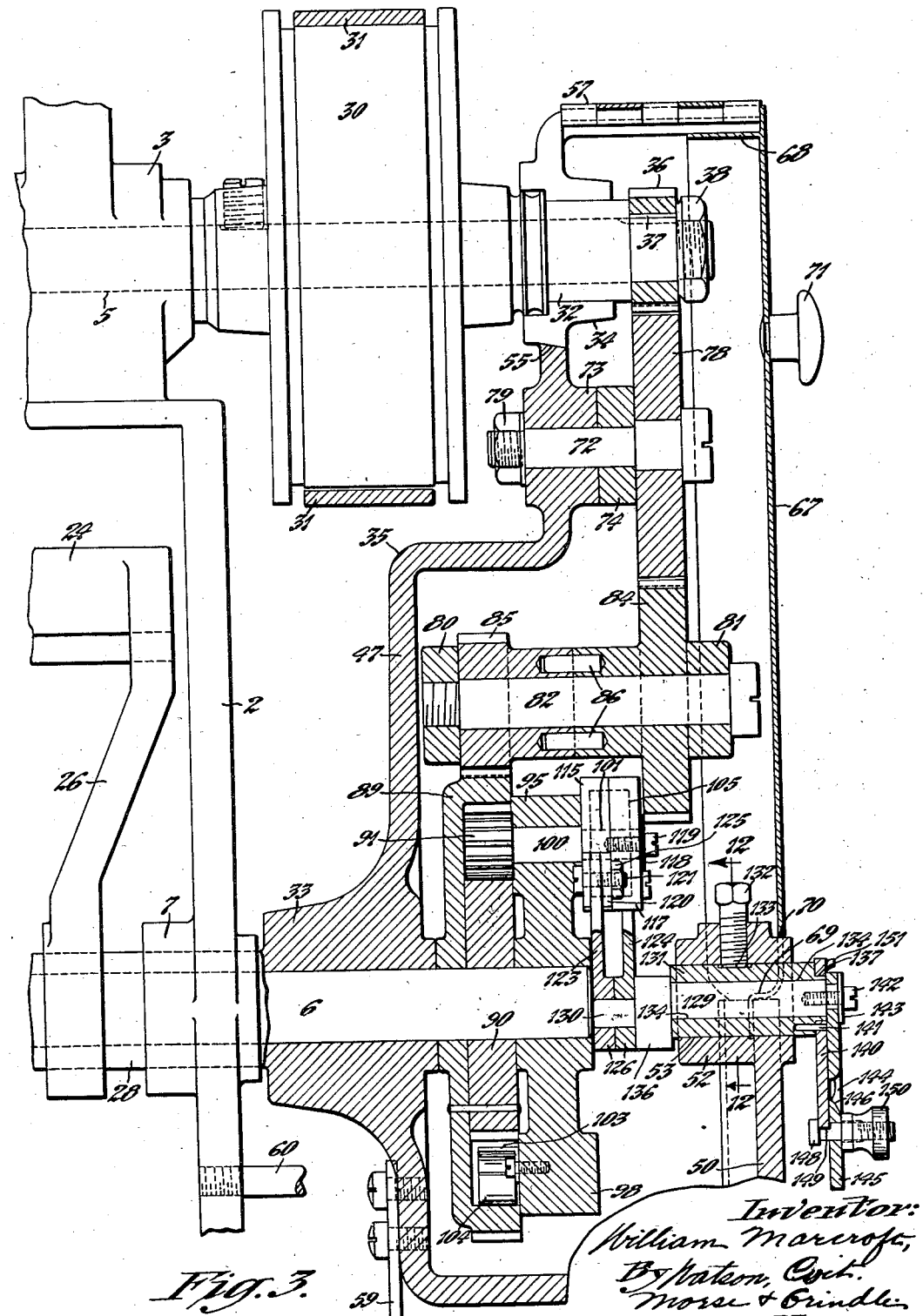
Fig. 3 is a vertical sectional view through the gainer mechanism taken on line 3—3 of Fig. 2.

The rearward wall of the casing 35 is formed with a hub or boss 33 which is reduced in diameter and extended in the bushing 28, previously referred to as being axially bored to serve as a journal for the cam-shaft 6. As shown in Fig. 3, the cam-shaft 6 projects into the interior of the casing 35 for connection with the gainer mechanism which is geared to the winding-spindle 5 in the manner as later explained.

The split bearing boss 34 in the upper part of the casing 35, previously referred to as receiving the reduced end of the hub 32 of the driving pulley 30, is provided for the purpose of dividing the casing into two parts whereby it may be opened and swung to one side for a purpose as later explained. The casing 35 is split vertically through the axis of the spindle 5 to a point slightly below the boss 34 and then laterally through its side as indicated at 55 in Fig. 2. The smaller section 56, formed by splitting the casing as described, provides a cap or closure which is pivotally connected to the main section by means of a hinge 57. Through this provision the closure 56 may be swung upwardly on its hinge 57 to permit the casing to be tilted or rocked about the axis of the cam-shaft 6 in the manner as illustrated in Fig. 9. The purpose of this arrangement is to facilitate the placing of the driving belt on opposite sides of the driving pulley 30 without disconnecting the ends of the belt. For limiting the swinging movement of the casing 35 a stop-member 59 fastened to its rearward wall is adapted to strike against a stud 60 projecting from the main frame 2 of the machine.

Means are provided for locking the cap or closure 56 in closed position with the two halves of the bearing boss 34 closely seated around the end of the hub 32 of the pulley 30. As shown in Figs. 1 and 2, a threaded eye-bolt 62 pivoted on a pin extending between the sides of a U-shaped bracket 63 on the side of the main section of the casing 35 is adapted to be received between the sides of a similar bracket 64 on the closure 56.

A nut 65 screwed down upon the eye-bolt 62 against the bracket 64 draws the cap or closure 56 snugly into place against the main section of the casing 35 to effect an oil-tight joint.

A sheet-metal plate or cover 67, shaped substantially to the contour of the casing 35, is provided with a marginal flange 68 adapted to fit tightly within the side walls of the casing to hold it in place thereon. The lower part of the cover 67 is formed with hooked prongs 69 adapted to engage in back of the upper edge of the semicircular plate 50, previously described, the bottom edge of the cover being cut away at 70, see Fig. 3, to clear the boss 52 on the plate. A knob or handle 71 on the cover 67 facilitates its removal for inspection of the enclosed mechanism or when it is required to substitute different change-gears.

Pivotally mounted on a bolt or stud 72 projecting forwardly with the casing 35 from a boss 73 on its rearward wall is an arm 74 formed at its end with an arcuate slot 75 disposed concentrically of the stud 72. A bolt 76 projecting through the slot 75 in the arm 74 is screwed into a threaded hole in the casing 35 to secure the arm in different positions of angular adjustment about the stud 72.

A spur-gear 78 journaled on the bolt or stud 72 is arranged in mesh with the gear 36 on the spindle 5. As shown in Fig. 3, the gear 78 is journaled on an enlarged portion of the stud 72 with the head of the latter retaining it in place abutting the side of the arm 74. A nut 79 screwed onto the rearward threaded end of the stud 72 binds its shoulder against the arm 74 to clamp the latter against the end of the boss 73.

The lower portion of the arm or bracket 74 is formed with a forked extension through the sides 80 and 81 of which extends a stud 82. The stud 82 has its head abutting one side of the fork with its reduced threaded portion screwed into a hole in the opposite side. Journaled on the stud 82 between the sides 80 and 81 of the fork are two spur-gears 84 and 85 secured rotatively together by means of dowel-pins 86 held in alining holes in the abutting ends of the hubs of the gears. The larger gear 84 meshes with the gear 78, previously referred to, while the smaller gear 85 meshes with a relatively large spur-gear 89 mounted free to rotate on the camshaft 6. The gear 85 is constituted as a change-gear, being displaceable to permit the substitution of a gear of different size. When a change-gear of different size is to be substituted for the gear 85 the bolt 76 is loosened and the arm 74 swung on the stud 72 to properly enmesh the gears, after which the bolt is again tightened.

Figure 4:
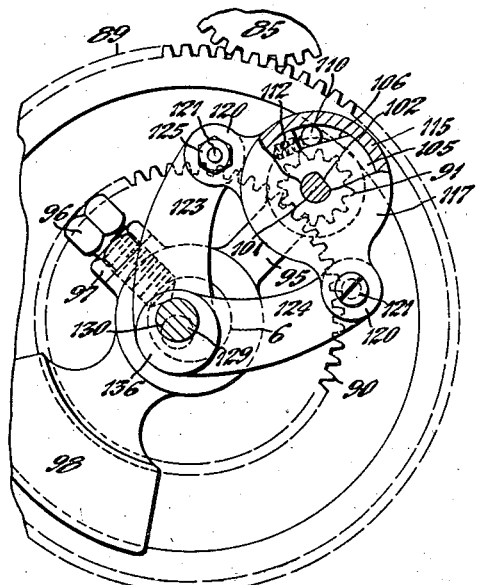
Figs. 4, 5, 6 and 7 are end views of the clutch-device of the mechanism, illustrating different relative positions of its parts during one complete revolution of the driven cam-shaft.
Figure 5:
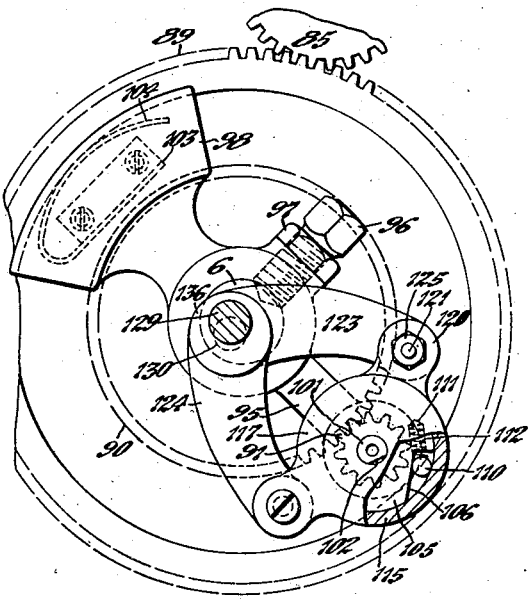
Figure 7:
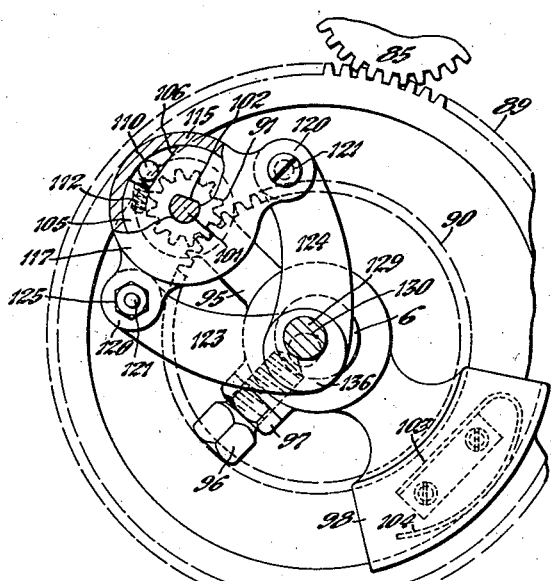
Figure 6:
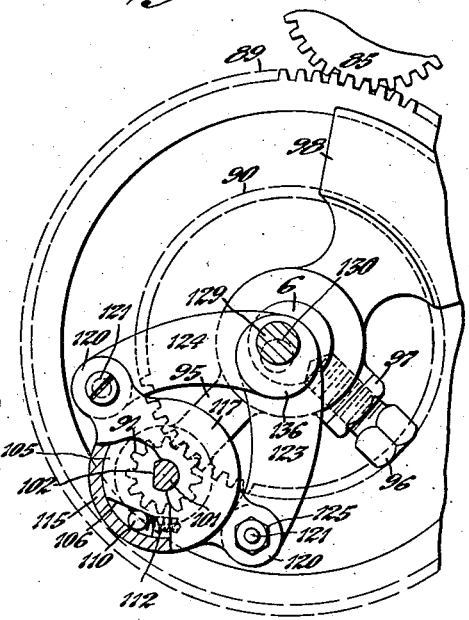

The gear 89 is of saucer shape with its annular rim formed with external teeth which mesh with the teeth of the gear 85. Riveted to the recessed face of the gear 89 is a smaller spur-gear 90 which meshes with a planetary pinion 91 carried at one end of a crank-arm or driven member 95 secured fast to the cam-shaft 6 by means of a set-screw 96, see Figs. 1 and 4. As shown in Fig. 4, the set-screw 96 has a pointed extremity which seats in a conical indentation in the periphery of the shaft 6 to secure the arm 95 both longitudinally and rotatively of the shaft. A check-nut 97 on the set-screw 96 is screwed against a boss on the hub of the arm 95 to prevent loosening of the screw. The crank-arm 95 is extended across the axis of the shaft 6 in a weighted end 98 acting to counterbalance the arm and the pinion 91 carried thereby.

The pinion 91 constitutes the driving connection between the gear 90 and the arm 95 which drives the camshaft 6. The pinion 91 is revolved about the axis of the shaft 6 with a planetary motion as it moves with the gear 90 and during each revolution it is turned on its own axis to advance the arm 95 with respect to the gear 90. Consequently, the cam-shaft 6 is given an increment of motion in relation to the gears 89 and 90 to effect a slight variation in the speed ratio between the winding-spindle 5 and the traversing means operated by the cam. The means for rotating the pinion 91 is organized as next described.

Figure 8:
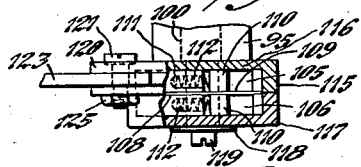
Fig. 8 is a detailed view of the clutch-device shown with its annulus partly broken away.
Figure 19:
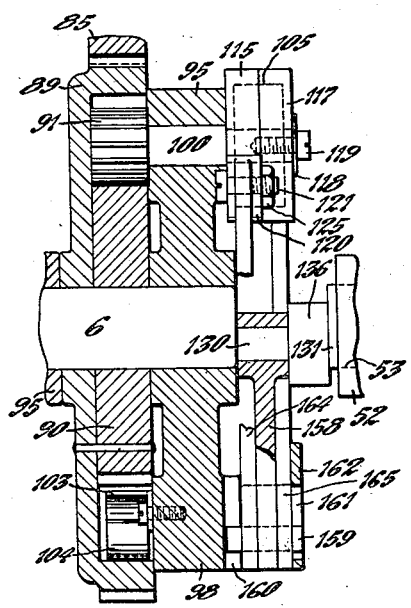
Fig. 19 is a cross-sectional view of this latter form of clutch-device taken on line 19—19 of Fig. 17.

The pinion 91 may be keyed to or formed integral with its shaft 100 which is journaled in a bearing at the end of the crank-arm 95. The shaft 100 projects beyond the side of the crank-arm 95 in a reduced portion 101 which is flattened on one side, as indicated at 102 in Figs. 4 to 7, to adapt it to fit a similarly shaped axial hole in a clutch-disk 105. The clutch-disk 105 is formed with a notch-like pocket 106 in its periphery, one face of which extends radially of its axis with its other side disposed at right-angles thereto. As shown in Fig. 8, the disk 105 is formed with a circumferential slit 108 in which is inserted a relatively thin separator-plate 109. Seated within the pocket 106 on opposite sides of the separator 109 are a pair of rollers 110 adapted to engage frictionally with the inner rims of two enclosing annuli or clutch-rings 115 and 117. Held in holes 111 in the side of the pocket 106 are two coil-springs 112 arranged to bear against the rollers 110 to urge them toward the narrower end of the pocket 106 into binding engagement with the clutch-annuli 115 and 117.

The clutch-annulus 115 is constructed integral with a disk 116 mounted free to rotate on the shaft 100 between the disk 105 and the crank-arm 95 with the annulus overlying the periphery of the disk 105 throughout half its width, see Figs. 3 and 8. At the opposite side of the disk 105 is the complementary clutch-element 117 arranged with its annular rim overhanging the other half of the disk 105. It will be understood by reference to Fig. 4 that as the rollers 110 are urged toward the narrower end of the pocket 106 under the action of the springs 112 they will be caused to wedge against the overhanging annular rim portions of the clutch-elements 115 and 117 to rotatively connect the latter with the disk 105. The clutch-elements 115 and 117 together with the disk 105 are retained in place on the reduced end of the shaft 100 by means of a washer 118 secured in place by a screw 119 screwed into a threaded hole in the end of the shaft.

Under a clockwise rotation of the clutch-elements 115 and 117, as viewed in Fig. 4, the rollers 110 will be wedged between their annular rims and the bottom of the pocket 106 in the disk 105 to clutch the parts together. On the other hand, counterclockwise rotative movement of the clutch-elements 115 and 117 will cause the rollers 110 to roll toward the larger end of the pocket 106 against the action of the springs 112 to declutch the disk 105 from the clutch-elements. Means as next described are provided for concurrently oscillating the clutch-elements 115 and 117 in opposite directions to effect a relatively slow continuous rotation of the disk 105 to concurrently rotate the pinion 91 to cause it to travel circumferentially of the gear 90.

The clutch-elements 115 and 117 are formed on their rims with radially-projecting lugs or ears 120 which are forked as shown in Fig. 8. Pivotally joined to studs 121 extending through the ears 120 of each element are two opposite rocker-arms 123 and 124. The studs 121 have reduced threaded ends screwed into holes in one side of the ears 120 and to prevent them from loosening check-nuts 125 are screwed onto their projecting threaded ends and set up against the side of the lugs. As herein shown the rocker-arms 123 and 124 are of curved outline and formed at one end with hubs 126 rotatably mounted on the eccentrically disposed crank-pin 130 of a crank-shaft 129 to be later described. Referring to Fig. 3, the hub portions 126 are arranged in abutting relationship on the crank-pin 130 and held in place by the end of the hub of the member 95.

Referring now to Figs. 1, 3 and 12 of the drawings, a bushing 131 extending through the boss 52 of the plate 50 on the casing 35 is held fast therein by means of a set screw 132 engaging against a flatted portion 133 of its periphery. The bushing 131 is formed with a bore 134, disposed eccentrically with respect to its axis, in which is rotatably mounted the crank-shaft 129. As shown most clearly in Figs. 3, 10 and 11, the crank-shaft 129 is formed with an enlarged portion or head 136 abutting the inner end of the bushing 131 and the eccentric crank-pin 130, before mentioned, is constituted by a reduced axial extension of the head. The crank-pin 130 is thus offset or disposed eccentrically with respect to the axis of the main portion of the shaft 129 as shown in Figs. 10, 11, 13, 14 and 15 to provide for adjusting its eccentricity with respect to the axis of the cam-shaft 6. The degree of eccentricity of the crank-pin 130 with respect to the axis of the shaft 129 is equal to the offset distance of the axis of the shaft from the axis of the bushing 131. The crank-pin 130 serves as an eccentric pivot for the ends of the rocker-arms 123 and 124 so that as the latter are revolved about the cam-shaft 6 they are actuated to oscillate the clutch-elements 115 and 117 to cause them to rotate the disk 105 in the manner as later more fully explained. The means for manually adjusting the crank-shaft 129 to regulate the eccentricity of the crank-pin 130 is arranged as next described.

Referring particularly to Figs. 2 and 3 of the drawings, the bushing 131 projects outwardly beyond the end of the boss 52 on the plate 50 with its end reduced in diameter to form a shouldered portion 137 arranged concentric with its axial bore. Held on the reduced end 137 of the bushing 131 is a substantially semicircular plate or dial 140 having its face marked with radial graduations for a purpose as later explained. The dial 140 is held from turning on the bushing 131 by means of a dowel-pin 141 projecting from the end of the bushing through a hole in the dial. The outer end of the crank-shaft 129 is reduced in diameter to receive an adjusting handle 145 suitably keyed thereto and provided with a finger-knob 150. The handle 145 is held in place against the shoulder on the shaft 129 by means of a headed screw 142 extending through a washer 143 abutting the side of the handle and screwed into a threaded hole in the end of the shaft. The handle 145 thus serves as a means for rotatively adjusting the crank-shaft 129, being formed with an opening 144 through which the graduations on the dial 140 may be viewed. The side of the opening 144 is formed with a pointer or indicator 146 adapted to register with the graduations as the handle is turned to adjust the crank-shaft 129.

Means are provided for locking the handle 145 in its different positions of adjustment on the dial comprising a stud 148 extending through the handle 145 and knob 150 and slotted across its inner end at 149 to engage around the edge of the dial 140. The knob 150 is screw-threaded onto the forward end of the stud 148 so that by tightening the knob against the handle 145 the latter is clamped firmly to the dial 140. At the ends of the circular edge of the dial 140 are two lugs or projections 151 which serve as stops for limiting the movement of the handle 145.

As shown in Fig. 2, the dial 140 is provided with one hundred and twenty graduations marked in units of ten from "0" to "12". When the handle 145 is adjusted to zero on the dial the crank 130 is turned to the position illustrated in Fig. 13 to bring its axis into alinement with the axis of the bushing 131. In this position the enlarged head 136 and the bushing 131 may be inserted through the bore 53 of the hub 52 to assemble the adjusting elements on the casing 35.

In winding machines of the present type suitable braking means are usually employed for promptly arresting the rotation of the spindle when the thread breaks or its supply is exhausted. If the winding-spindle and cam-shaft are not positively connected the force of momentum will have a tendency to continue the rotation of the cam after the spindle stops, due to inertia. This results in disturbing the relationship of the thread-guide with respect to the coils already wound on the package so that when the machine is again started the subsequently wound coils may not be properly applied to position. To prevent such displacement or overrunning of the thread-guide with respect to the package, braking or dogging means are preferably applied directly to the cam-shaft 6. A brake-element 103 secured to the inner side of the weighted end 98 of the crank-arm or driven element 95 is formed with an arcuate depending arm 104 adapted to engage against the interior of the peripheral rim of the gear 89, see Figs. 2 and 3. When the machine is in operation the resilient arm 104 slides freely around the gear 89; but if the rotation of the spindle 5 is arrested the arm 104 acts to dog against the gear 89 to resist rotative movement of the cam-shaft 6 whereby to promptly bring it to a stop.

The improved gainer mechanism having now been described in one preferred form of construction its method of operation will next be explained. When it is desired to wind a package of thread or other strand material a suitable cop-tube c or other receiver is secured to the cop-holder 10, the strand t drawn upwardly from its supply, threaded through a suitable tension-device, not shown, and thence inserted in the groove in the thread-guide head 19 with its end attached to the cop-tube c in the usual manner. Assuming that it is desired to produce a "three-wind" package in which the thread t is traversed the length of the package during three revolutions of the spindle 5, the ratio of speed between the spindle and the cam-shaft 6 is made six to one. That is to say, the cop-tube c must make three revolutions during one-half a revolution of the cam which traverses the thread-guide in one direction. To obtain the desired ratio a suitable change-gear 85 is applied to the stud-shaft 82 in the manner as previously explained.

The winding operation is started by manipulating the handle 40 to swing the arm 42 away from the lever 43 whereby to release the idler-pulley 44 to cause the driving belt 45 to be pressed against the pulley 30. As the pulley 30 is driven from the belt 31 the spindle 5 is rotated to wind the thread on the cop-tube c while the cam-shaft 6 is driven through the train of gearing connecting it with the spindle.

Assuming that the handle 145 of the gainer adjusting device is set at zero on the dial 140, the crank-pin 130 will be positioned in line with the axis of the cam-shaft 6 so that no motion will be imparted to the rocker-arms 123 and 124 as they revolve about the axis of the cam-shaft. With this setting the disk 105 will remain declutched from the elements 115 and 117 so that the pinion 91 receives no impulse therefrom and therefore it will act to key the crank-arm 95 to turn with the gear 90 at the same rate of speed. The cam-shaft 6 and the cam 15 will therefore be driven at a fixed rate of speed to impart a reciprocatory movement to the slide 24 and its connected traverse-rod 23 and thread-guide 20. As the thread-guide 20 is traversed to and fro along the cop-tube c it acts to deposit the yarn in spiral coils extending from end to end thereof which build up in layers to form the package P.

For convenience in calculating the size of the required change-gear 85 the driven gear 89 may be assumed to have an even number of teeth, for example, ninety-six teeth, but in reality, it is provided with one extra tooth, or, in the present case, ninety-seven teeth whereby the resultant speed ratio between the spindle 5 and cam-shaft 6 is slightly in excess of six to one so that the cam is rotated at a slightly slower speed than initially determined. Through this provision a constant loss in the speed of the cam takes place so that an "after" wind is produced with each coil of winding deposited slightly behind the previously wound coil. When relatively fine yarn is being wound with the indicator 145 set at zero the coils will usually be spaced apart to produce an open wind. It is therefore necessary to adjust the gainer mechanism to change the speed ratio to cause the coils to be wound closer together. To effect this adjustment the handle 145 is disengaged from the dial 140 and turned in a clockwise direction, as viewed in Fig. 2, to rotate the shaft 129 to adjust the crank-pin 130 eccentrically of the axis of the cam-shaft 6.

By adjusting the crank-pin 130 in eccentric relation to the axis of the cam-shaft 6 the crank will impart a reciprocatory motion to the rocker-arms 123 and 124 to concurrently oscillate the two clutch-elements 115 and 117 in opposite directions. This opposite oscillatory motion of the clutch-elements 115 and 117 has the effect to alternately declutch one of them from the disk 105 while the other element is clutched thereto and turned ahead through a part of a revolution with the direction of motion of the clutch-elements reversed at each half revolution of the clutch about the cam-shaft 6. Through this means the pinion 91 is caused to be continuously rotated in a clockwise direction as viewed in Figs. 2, 4, 5, 6 and 7 to travel it around the circumference of the gear 90. Under this action the crank-arm 95 is given an increment of motion or, in technical terms, a "gain" in speed with respect to the gear 90 whereby an increase in the speed of the cam-shaft is effected. The "gain" or increment of motion may be minutely controlled by adjusting the indicator handle 145 on the dial 140 to regulate the degree of eccentricity of the crank-pin 130 and thereby the range of action of the arms 123 and 124. In this manner the proper ratio of speed between the spindle and thread-guide may be accurately determined to cause the coils of winding to be laid side by side in close relationship with either an "after" or "head" wind.

It has been determined in practice that when the indicator handle 145 is advanced to approximately one-fourth of its full adjustment, that is, to the graduation numbered "3" on the dial the coils of winding will tend to crowd or pile, one upon the other. This is due to the fact that the exact six-to-one speed ratio will have been reached. As the indicator is turned beyond this point, however, the speed of the cam is increased over that initially determined by the ratio of the gears in the train so that the pinion 91 will be advanced to a greater extent with respect to the gear 90 and the coils of winding will be gradually opened out. Through this adjustment a "head" wind may be produced with each coil deposited in place in advance of the one previously wound. By means of the adjusting device the degree of rotative movement of the pinion 91 may be positively controlled to regulate the disposition of the coils in accordance with the character of the wind desired and with an accurate disposition thereof in proportion to the size or thickness of the thread being wound.

Fig. 16 of the drawings illustrates a modified form of construction of the clutch-device for rotating the disk 105 and pinion 91. In this embodiment of the invention the periphery of the disk 105 is provided with a plurality of V-shaped notches 154, in which are pivotally seated finger-like grippers 155 adapted to be wedged against the interior of the rims of the annular clutch-elements 115 and 117 under the action of the pocketed springs 112. The inner ends of the grippers 155 are rounded to adapt them to pivot in the rounded bottoms of the grooves 154 and their outer ends are cam-shaped to cause them to release the clutch-annuli when the latter are turned in counterclockwise direction as viewed in Fig. 16.

In Figs. 17 to 20, inclusive, there is illustrated a modified form of construction of the means for effecting rotation of the pinion 91. In this embodiment of the invention a lever 158 connected at one end to the crank-pin 130 carries a pin 159 at its opposite end projecting from both of its sides. One end of the pin 159 is arranged to slide in a radial groove 160 in the weighted end 98 of the crank-arm 95 while its opposite end is slidably engaged in a slot 161 formed in the side of a U-shaped element 162 fastened to the side of the weighted arm. A pair of elongated rocker-arms 164 and 165 are connected at one end to the clutch-elements 115 and 117, in the manner as previously explained, while their opposite ends are pivotally mounted on the pin 159 at either side of the lever 158.

Figure 17:
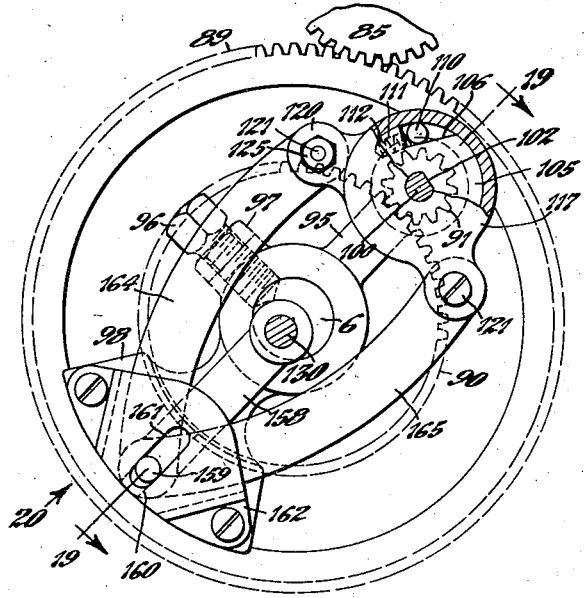
Figs. 17 and 18 are end views of a modified form of construction of the operating means for the clutch-device illustrating the relationship of the parts at the completion of each indexing stroke.
Figure 20:
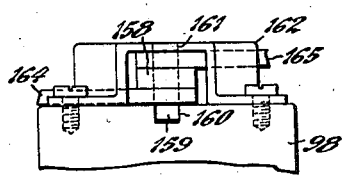
Fig. 20 is an end view of the same viewed in the direction indicated by arrow 20 in Fig. 17.
Figure 18:
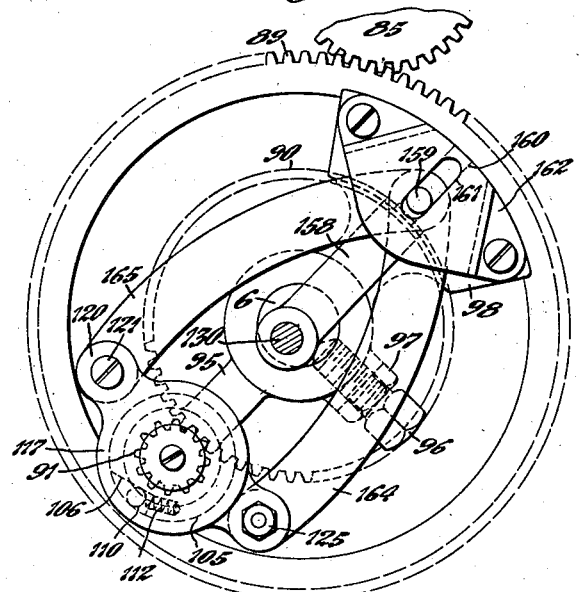

In operation the lever 158 is rotated about the crank-pin 130 through its connection with the crank-arm 95 with the pin 159 sliding radially in the groove 160 and slot 161, the opposite extremes of movement of the parts being illustrated in Figs. 17 and 18. As the pin 159 is oscillated in this manner the rocker-arms 164 and 165 are actuated to rotate the disk 105 and pinion 91. With this form of construction rotary movement of the lever 158 about the crank-pin 130 causes radial sliding movement of the pin 159 and the motion imparted to the rocker-arms 164 and 165 is positive in action without dwell or lost motion occurring at the extremes of throw. Through this provision the clutch-elements 115 and 117 are indexed without momentary dwell at the ends of their motion.

In Figs. 21, 22 and 23 there is illustrated a means for effecting micrometer adjustment of the indicator handle 167 on the dial 168. The dial 168 is secured to the reduced end 137 of the bushing 131 by means of a dowel-pin 141 and the handle 167 is fastened to the outer reduced extremity of the shaft 129 by means as previously described. An auxiliary adjusting element 170 is mounted to turn on the crank-shaft 129 between the dial 168 and the handle 167, being spaced from the dial by means of a washer 169 on the shaft, see Fig. 23. The element 170 comprises a portion having a circular rim 171 with a horizontal arm 172 projecting laterally therefrom. The indicator handle 167 is adapted to be clamped against the side of the rim 171 by means of the stud 148 and knob 150, previously described. The handle 167 is formed with a pointed end bent inwardly to bear against the stationary dial 168.

Extending vertically along the side of the gear-casing 35 is an adjusting shaft 175 journaled in brackets 176 and 177 attached to the top and bottom of the casing. The lower bracket 177 is of U-shape with its opposite parallel arms formed with holes through which the lower threaded end of the shaft 175 extends. The shaft 175 is retained in place in the arms of the bracket 177 by means of nuts 178 abutting thereagainst; the nuts being prevented from loosening by check-nuts 179.

A square nut 180 engaging the threaded end of the shaft 175 between the arms of the bracket 177 is arranged with its side abutting the vertical portion of the bracket to prevent it from turning on the rod. The nut 180 carries a pin 181 engaging through a horizontally extending slot 182 in the end of the arm 172 of the adjusting element 170. The shaft 175 is adapted to be turned manually by means of a knurled handwheel 185 secured upon its upper reduced end by a nut 184. The handwheel 185 is located in readily accessible position above the top of the gear casing 35 as shown in Fig. 21 and indicated in dash lines in Fig. 1.

With the arrangement of the micrometer adjusting device as above described the operator of the winding machine may assume a position at the front end thereof, where the winding operation may be readily inspected, and still have convenient access to the adjusting means. To adjust the gainer mechanism in accordance with requirements the indicator handle 167 is first set at approximate position on the dial 168 and clamped against the rim 171 of the element 170. The winding operation is started and if it should be observed that the coils are not properly spaced the operator may reach across the top of the machine to turn the handwheel 185 to alter the adjustment of the gainer mechanism. As the shaft 175 is rotated from the handwheel 185 the nut 180 is raised or lowered, according to the direction of rotation of the shaft, and through its pin and slot connection with the element 170 the latter is turned about the axis of the crank-shaft 129. The indicator handle 167, being fast with the element 170, is likewise turned to effect rotative movement of the crank-shaft 129 to which it is connected. In this manner the crank-pin 130 is swung toward or away from the axis of the cam-shaft 6 to minutely adjust its eccentricity with respect thereto without requiring the operator to take up a position at the rear of the machine for altering the adjustment.

It will be observed from the foregoing that the present invention provides an improved gainer mechanism for use with winding and like machines for controlling the speed ratio between the strand-traversing means and winding-spindle. The device operates with great precision to control the disposition of the coils or convolutions of winding deposited on the package being wound and may be minutely adjusted in accordance with the size of the yarn and other requirements.

The improved device thus makes for greater precision of operation of the machine whereby to improve the quality of the winding and secure uniformity of the product. The complete device is simple in construction, durable in use and proof against derangement or getting out of order.

I am aware that it is old in the art to employ epicyclic gearing wherein a planetary pinion is rotated on its own axis by means of a ratchet mechanism during its motion of translation about a fixed axis. In this previously used form of construction, however, the rotation of the pinion is only intermittent with a dwell occurring each time the ratchet is turned back to take a fresh grip on the teeth of the rotating element, only a single link or rocker-arm being used to turn the ratchet. Moreover, even though the teeth of the ratchet are relatively fine, lost motion necessarily occurs between the actuating means and the ratchet so that from these causes the planetary pinion cannot be rotated continuously at a fixed rate to effect a constant and uniform gain in the speed of the driven shaft or element.

In accordance with the present invention, the two clutch-elements which advance the clutch-disk to rotate the planetary pinion move concurrently in opposite directions so that when one element is operative the other element is being returned to first position and vice versa with respect to the other element. In this way a continuous rotation of the pinion is effected to secure a uniform and constant gain of the driven shaft carrying the traverse-cam. Furthermore, since the friction means grip the clutch-disk instantly upon reversal of movement of the clutch-elements there is practically no lost motion or back lash, as in the case of a ratchet, so that the gain is accurately defined in accordance with the adjustment of the device.

While I have herein shown and described several preferred embodiments of the invention, by way of example, it is to be understood that other modifications may be made in the construction and arrangement of its parts without departing from the spirit or scope of the invention. Therefore, without limiting myself in this respect, I claim:

1. In a gainer mechanism for winding machines, the combination of a driving gear, a rotary element adapted to be driven from said gear, a pinion carried by said last-named element in mesh with the driving gear, a pair of friction clutches for rotating the pinion to travel it relatively of the driving gear, a fixed pin disposed eccentrically with respect to the axis of the driving gear, and a pair of arms connecting said eccentric pin and clutches to cause the arms to oscillate the clutches to intermittently turn the pinion to advance it circumferentially of the driving gear during its planetary motion therewith.

2. In a gainer mechanism for winding machines, the combination of a driving gear, a driven element rotatable about the axis of the driving gear, a pinion carried by said driven element in mesh with the driving gear, a clutch member fast with the pinion, a pair of clutch members rotatable with respect to the first member, friction means for engaging the pair of clutch members with the first member, a pair of arms for oscillating said pair of clutch members to turn the first member to rotate the pinion, and eccentric means for oscillating the arms.

3. In a gainer mechanism for winding machines, the combination of a driving gear, a driven element rotatable independently of the driving gear, a pinion journaled on the driven element in mesh with the driving gear, a clutch-disk rotatively connected with said pinion, a pair of clutch-annuli rotatable independently of the disk, friction means operative during the rotation of each clutch-annulus in one direction to clutch it with the disk, a pair of arms for oscillating the clutch-annuli to rotate the disk to travel the pinion on the driving gear, and means for oscillating said arms.

4. In a device of the type indicated, the combination of a driving gear, a driven member rotatable about the axis of the gear, a pinion carried by said member in mesh with the driving gear, a clutch member connected to rotate the pinion, a pair of clutch elements, means for independently and alternately engaging said clutch elements with the clutch member, a plurality of means connected with the clutch elements on opposite sides of the axis thereof to oscillate said elements to continuously rotate the pinion to travel it on the driving gear to impart an increment of motion to the driven element as it is rotated by said gear, and means to actuate said oscillating means for the clutch elements.

5. In a device of the type indicated, the combination of a driving gear, means for driving said gear, a driven member rotatable about the axis of the driving gear, a pinion journaled on said member in mesh with the driving gear, a clutch member rotatively connected with the pinion, a pair of clutch elements rotatable on the axis of the clutch member, friction means for clutching each of the clutch elements with the single clutch member, arms connected with the clutch elements at opposite sides of the axis thereof, and eccentric means for actuating the arms to impart to-and-fro oscillating movement to the clutch elements to cause first one and then the other element to be clutched with the clutch member to continuously rotate the pinion to travel it around the driving gear.

6. In a device of the type indicated, the combination of a shaft, a driving gear free to rotate on said shaft, a driven member fast with the shaft, a pinion journaled on the driven member in mesh with the driving gear, a clutch-disk fast with the pinion, a pair of clutch-annuli rotatable independently of the clutch-disk, friction means for clutching the disk with the clutch-annuli when the latter are rotated in a predetermined direction, a pair of arms pivotally connected to the clutch-annuli on opposite sides of their axes, and means for actuating said arms to oscillate the clutch-annuli during the rotation of the driven member to cause the pinion to be clutched therewith and turned to advance it circumferentially of the driving gear.

7. In a device of the type indicated, the combination of a shaft, a gear rotatable on said shaft, a member fast on the shaft, a pinion journaled on said member in mesh with the gear, a clutch member rotatively connected with the pinion, a pair of clutch elements rotatable with respect to the clutch member, friction means for independently engaging said clutch elements with the clutch member, a crank adjustable eccentrically with respect to the axis of rotation of the gear, and arms connecting said crank with the clutch elements on opposite sides of the axis thereof to cause said elements to be oscillated to effect a clutching and declutching action of each element with the clutch member whereby to rotate the pinion to advance it circumferentially with respect to the gear.

8. In a device of the type indicated, the combination of a drive-shaft, a driven shaft, a driving gear free to rotate on the driven shaft, gearing connecting said gear with the drive-shaft, a member fast on the driven shaft, a pinion journaled on said member in mesh with the driving gear, a clutch member fast with the pinion, a pair of clutch elements rotatable with respect to the clutch member, means for individually engaging the clutch elements with the clutch member during the rotation of said elements in a predetermined direction and operative to declutch said clutch member when the elements are turned in the opposite direction, and means for continuously oscillating said clutch elements to impart rotation to the pinion to travel it circumferentially of the driving gear.

9. In a device of the type indicated, the combination of a driving gear, a driven member rotatable about the axis of the gear, a pinion journaled on the driven member in mesh with the driving gear, a disk fast with the pinion, a pair of elements rotatable on the axis of the disk, means for independently and alternately connecting said elements with the disk when said elements are turned in a predetermined direction and releasable upon movement of said elements in the opposite direction, and means for simultaneously oscillating said elements in opposite directions whereby to cause them to continuously rotate the disk with a ratchet action with one element operative while the other is inactive to turn the pinion to travel it circumferentially of the driving gear.

10. In a device of the type indicated, the combination of a shaft, a gear free to rotate on said shaft, a driven member fast on the shaft, a pinion-shaft journaled on said driven member in eccentric relation to the axis of the first-named shaft, a pinion on said pinion-shaft meshing with the driving gear, a clutch-disk on the pinion-shaft, a pair of independently rotated clutch elements each having an annulus overhanging the clutch-disk, friction means acting between the clutch-disk and the annuli to clutch the latter thereto during the rotation of the clutch elements in one direction and releasable during the rotation of the elements in the opposite direction, arms pivotally connected to the clutch elements on opposite sides of the axis thereof, and eccentric means for actuating said arms to oscillate the clutch elements to rotate the pinion to advance it relatively of the driving gear during its planetary travel with the gear.

WILLIAM MARCROFT.